United States Patent
Shon et al.

(10) Patent No.: US 8,477,948 B2
(45) Date of Patent: Jul. 2, 2013

(54) METHOD AND APPARATUS FOR FORMING SECURITY CHANNEL IN SHORT RANGE COMMUNICATION

(75) Inventors: Tae-Shik Shon, Gyeonggi-do (KR); Yong-Suk Park, Seoul (KR); Jeong-Sik In, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 300 days.

(21) Appl. No.: 12/949,246

(22) Filed: Nov. 18, 2010

(65) Prior Publication Data

US 2011/0116631 A1 May 19, 2011

(30) Foreign Application Priority Data

Nov. 18, 2009 (KR) .................. 10-2009-0111496

(51) Int. Cl.
*H04L 29/06* (2006.01)
(52) U.S. Cl.
USPC ............ 380/283; 380/270; 380/255; 380/262
(58) Field of Classification Search
USPC .................. 380/255, 262, 270, 283
See application file for complete search history.

(56) References Cited

U.S. PATENT DOCUMENTS

| | | | | |
|---|---|---|---|---|
| 2004/0228360 A1* | 11/2004 | Bae et al. | ...................... | 370/432 |
| 2005/0228986 A1* | 10/2005 | Fukasawa et al. | ............ | 713/156 |
| 2006/0190726 A1* | 8/2006 | Brique et al. | .................. | 713/168 |
| 2007/0180229 A1* | 8/2007 | Salowey et al. | ............... | 713/156 |
| 2007/0293197 A1* | 12/2007 | Ekberg et al. | .............. | 455/414.1 |
| 2008/0307513 A1* | 12/2008 | Chow et al. | ........................ | 726/5 |

OTHER PUBLICATIONS

Cheolhee Park, Short-Range Wireless Communications, Aug. 2007, IEEE , vol. 14 Issue:4; pp. 70-78.*
N Saxena, JE Ekberg, K Kostiainen, N Asokan—Secure Device Pairing based on a Visual Channel, 2006 IEEE.*
Moazzam Khan; Fereshteh Amini; Jelena Misic; Vojislav B. Misic; , "The Cost of Security: Performance of ZigBee Key Exchange Mechanism in an 802.15.4 Beacon Enabled Cluster," Mobile Adhoc and Sensor Systems (MASS), 2006 IEEE International Conference on , vol., no., pp. 876-881, Oct. 2006.*
Qiang Huang el,Fast authenticated key establishment protocols for self-organizing sensor networks, WSNA '03 Proceedings of the 2nd ACM international conference on Wireless sensor networks and applications, pp. 141-150, ACM New York, NY, USA © 2003 table of contents ISBN:1-58113-764-8.*

* cited by examiner

*Primary Examiner* — Michael Simitoski
*Assistant Examiner* — Ali Shayanfar
(74) *Attorney, Agent, or Firm* — The Farrell Law Firm, P.C.

(57) ABSTRACT

A channel connection of a device that performs short range wireless communication is provided. If a public key that is broadcast by a specified device is received, the device encrypts its own UID (Unique Identifier) using the public key to transmit the encrypted UID to the specified device, transmits a pairing request to the specified device, and safely receives a key seed from the specified device using a security address included in a pairing device and the UID to form a security channel with the specified device.

20 Claims, 8 Drawing Sheets

METHOD AND APPARATUS FOR FORMING SECURITY CHANNEL IN SHORT RANGE COMMUNICATION

PRIORITY

This application claims priority under 35 U.S.C. §119(a) to an application entitled "Method And Apparatus For Forming Security Channel In Short Range Communication" filed in the Korean Intellectual Property Office on Nov. 18, 2009 and assigned Serial No. 10-2009-0111496, the contents of which are incorporated herein by reference.

BACKGROUND OF THE INVENTION

1. Field of the Invention

The present invention relates generally to short range communication, and more particularly, to a method and an apparatus for forming a security channel during a short range communication.

2. Description of the Related Art

In general, short range communication has been implemented in diverse terminals, such as a mobile communication terminal, a notebook computer, a PDA (Personal Digital Assistant), a portable DMB (Digital Multimedia Broadcasting) terminal, an MP3 (MPEG layer 3) player, a PMP (Portable Multimedia Player), and a PSP (PlayStation Portable).

In addition, short range communication modules are mounted on home appliances including a television receiver, a DVD (Digital Video Disk) player, a CD (Compact Disk) player, an air conditioner, and the like, and wireless connection between devices has generally been performed easily and simply. Accordingly, attempts and users' demands for providing diverse complex services through the configuration of a home network using wireless connection have increased, and diverse short range communication systems have been developed.

As one of such short range wireless communication systems, ZigBee RF4CE (Remote Control Standard for Consumer Electronics) has been designed to be applied to not only home entertainment appliances, such as an HD (High Definition) television receiver, home theater equipment, a set top box, and other audio equipment, but also diverse products, such as illumination controls, security monitoring, and keyless entry systems, based on IEEE (Institute of Electrical and Electronics Engineers) 802.15.4 PHY/MAC (PHYsical/Media Access Control) wireless technology using a frequency of 2.4 GHz.

In particular, an RF (Radio Frequency) remote controller implemented according to the ZigBee RF4CE standard has been developed to replace the existing IR (Infrared Ray) remote controller. The RF remote controller, in comparison to the IR remote controller, can freely operate appliances at a long distance regardless of the existence/nonexistence of obstacles, and provide a long battery life. Also, the RF remote controller enables bi-directional communication, and thus it is expected that the RF remote controller is suitable for a data broadcasting service.

Figure 1:
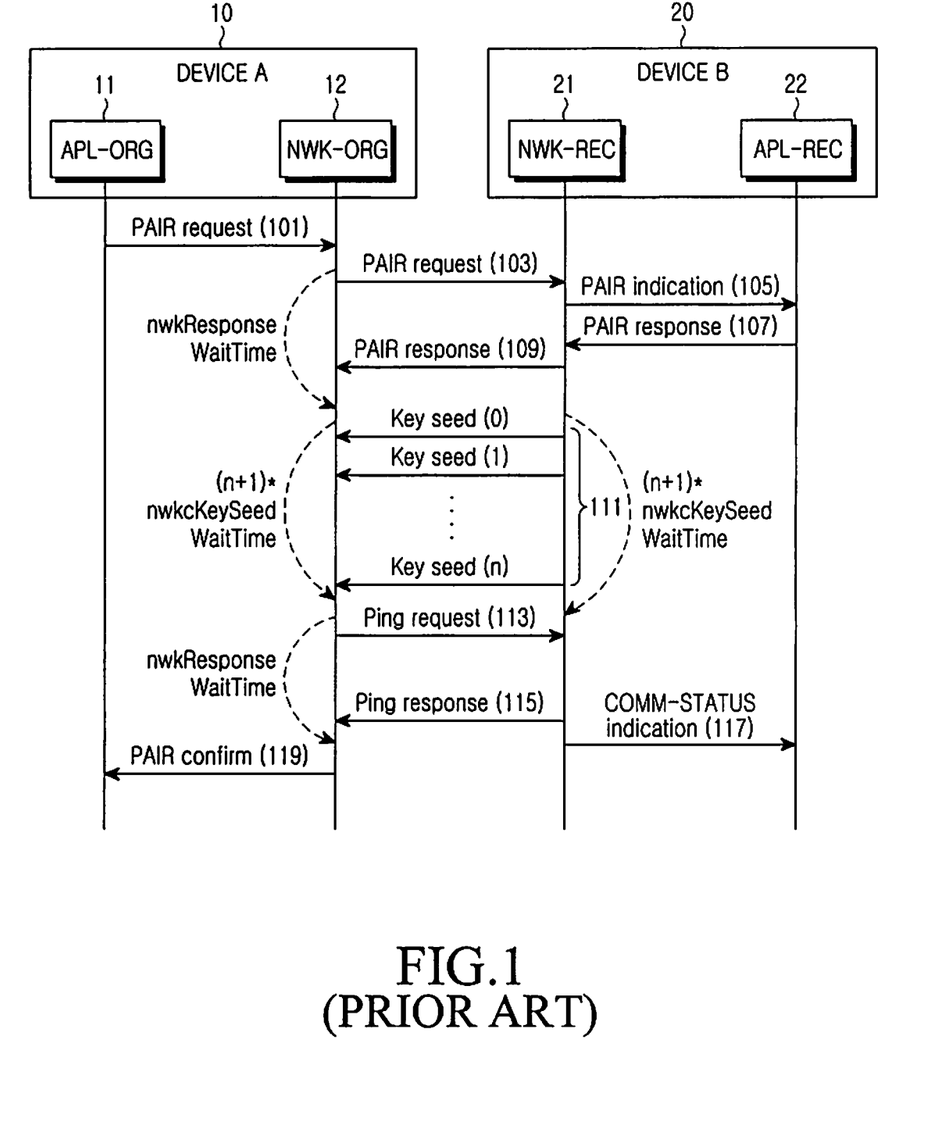
FIG. 1 is a flow diagram illustrating a channel connection process in the related art.

A process of connecting a channel between two devices, i.e. device A and device B, through ZigBee short range communication is illustrated in FIG. 1, which illustrates a general channel connection process. Device A 10 is a device which requests a channel connection and includes an application layer 11 and a network layer 12. Device B 20 is a device which responds to the channel connection, and includes an application layer 22 and a network layer 21.

According to a user's request or if necessary, the application layer 11 transfers a pair request to the network layer 12 in step 101. In the pair request, device A requests to pair up with device B. The pair request is generated according to user input or when a device performing the ZigBee short range communication exists. In step 103, the network layer 21 sets a response waiting time, and transmits the pair request to the device B 20.

The network layer 21 of the device B 20 transfers the received pair request in step 105 to the application layer 22, and the application layer 22 transfers the pair response to the network layer 21 in step 107.

The network layer 21 of the device B 20 transfers the pair response to the device A 10 in step 109. When the pair response is received, the network layer 12 of the device A 10 sets a reception waiting time of a network key seed. The network key seed is used for both devices 10 and 20 to generate a link key that is the same secret key.

On the other hand, the network layer 21 of the device B 20 generates (n+1)-numbered network key seeds in step 111, and transmits the network key seeds to the device A 10 one by one.

If all the network key seeds are received, the device A 10 generates a link key, and transmits a ping request for connecting a channel to the device B 20 in step 113. The device B 20 transmits a ping response to the device A 10 in step 115, and transfers the current state by sending a communication status (COMM-STATUS) indicator to the application layer 22 in step 117. The network layer 12 of the device A 10, if the ping response is received, transfers a pair confirm to the application layer 11 in step 119.

However, in the above-described channel connection process, the network key seed that is used to generate the same secret key between the two devices is transmitted in the form of plaintext. Accordingly, the network key seed is vulnerable to an attack of a Man-in-the-Middle. That is, there is a possibility that a third party, which is not the device 10 or 20, acquires the key seed and generates a secret key. Also, in order to generate a secret key, it is required to successively combine 255 key seeds at a maximum, and thus the third party may obstruct secret key generation by forging the sequence of a key seed frame or the seed value itself.

A method for solving this problem may be a method of protecting a key seed through encryption using a master key. However, it is not easy to safely distribute the master key, and this method is vulnerable to a node capture. Also, there may be a delay due to an encryption operation, and power consumption is increased. Also, this method has the drawback that it is still vulnerable to the attack that forges the sequence of the key seed frame or the seed value itself.

SUMMARY OF THE INVENTION

Accordingly, the present invention has been made to solve the above-mentioned problems occurring in the prior art, and the present invention provides a method and apparatus capable of providing secrecy, integrity, and availability for key seed values which are exchanged to generate a secret key between both devices after a pairing process.

Also, the present invention provides a method and apparatus capable of safely setting a security channel between two devices.

In accordance with an aspect of the present invention, there is provided a method of connecting a channel of a device that performs a short range wireless communication, which includes a control device receiving a public key that is broadcast by a target device; the control device encrypting its own UID (Unique Identifier) using the public key and transmitting the encrypted UID to the target device; the control device transmitting a pairing request to the target device; if the control device receives a pairing response, safely receiving a key seed from the target device using a security address included in the pairing response and the UID; and the control device generating a link key using the transmitted key seed and forming a security channel with the target device.

In the method of connecting a channel of a device according to an embodiment of the invention, receiving the key seed includes generating a selection mask using the security address and the UID; sequentially receiving a plurality of key seeds from the target device; and selecting a valid key seed from the plurality of key seeds using the selection mask; wherein the step of forming the security channel includes generating a link key using the valid key seed; and forming a security channel using the link key.

In the method of connecting a channel of a device according to an embodiment of the invention, receiving the key seed also includes receiving n-numbered encrypted key seeds; decrypting a first key seed using the UID and the security address; and acquiring n-numbered key seeds in total by decrypting the $n^{th}$ key seed using the UID, the security address, and the $(n-1)^{th}$ key seed; wherein the security channel is formed using the acquired key seeds.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EMBODIMENTS OF THE PRESENT INVENTION

Hereinafter, embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

The present invention provides a method capable of safely exchanging key seeds which are used for forming a security channel between two devices that perform short range communication, so that a more stable security channel is set. In particular, the present invention can be applied to ZigBee short range wireless communication more effectively.

According to the present invention, a process capable of performing mutual authentication between two devices is added before an initial pairing process, and an initial vector to be used for safe key seed exchange in the pairing process is allocated. Also, by using identification information used in the authentication process and the initial vector, a mask for selecting a key seed to be used for generating a link key from a plurality of key seeds is created. The key seed may also be encrypted and transmitted to heighten the security for the key seed.

Figure 2:
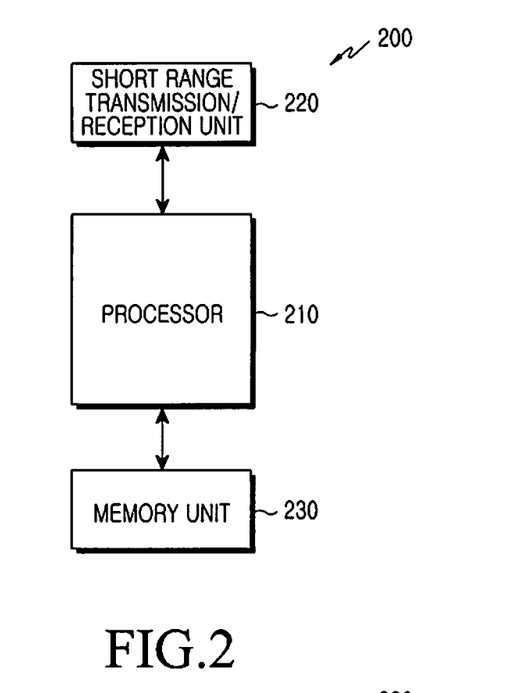
FIG. 2 is a flow chart illustrating the configuration of a device according to an embodiment of the present invention.

The configuration of a device to which the present invention is applied is illustrated in FIG. 2. Referring to FIG. 2, a device 200 includes a processor 210, a short range transmission/reception unit 220, and a memory unit 230.

The short range wireless transmission/reception unit 220, under the control of the processor 210, performs a short range wireless communication, and transmits/receives various kinds of data according to the short range wireless communication. The short range transmission/reception unit 220 can perform ZigBee short range communication according to an embodiment of the invention.

The processor 210 controls the entire operation of the device 200, and controls the short range transmission/reception unit 220 to make the short range wireless communication possible. In particular, the processor 210 controls all operations according to the channel setting process for the short range wireless communication.

The memory unit 230 stores therein programs for data process and control of the control unit 210, reference data, various kinds of updatable data for storage, and the like, and such programs and data are provided to a working memory of the control unit 210. The memory unit 230 may also store a public certificate allocated to the device 200 and an UID (Unique Identifier) of the device 200. Also, the memory unit 230 may store a sign. The sign is commonly issued to devices to which the short range wireless communication is permitted by a specified authentication authority, and is used in an authentication process for the device. The sign may be involved in the device production process or may be acquired through a process of performing a registration procedure in the authentication period. The sign may be used or may not be used in the authentication process.

Also, the memory unit 230 may store a pairing table. The pairing table is a table in which security addresses allocated to the currently paired opposite device and the corresponding device for the key seed security transmission are matched. The security addresses may be generated by the processor 210, and the validity period may be set for each security address.

Also, the memory unit 230 stores a security algorithm according to a key seed distribution mode. The key seed distribution mode is divided into a quick mode and a general mode. In the quick mode, a random selection mask is created and a key seed to be used for generating a link key among the entire key seeds is selected. In the general mode the key seed itself is encrypted and transmitted. Accordingly, the memory unit 230 can store a random selection mask algorithm and a key seed encryption algorithm.

During a channel connection, forming of the security channel may be set as a default value or according to a user's selection. In the case where a user determines whether to set the security channel, the processor 210 provides a user interface through which a user can input a command as to whether to set the security channel. For example, a security channel setting menu may be displayed. Accordingly, the user can select whether to form the security channel and also can select the key seed distribution mode. It is preferable that the key seed distribution mode is designated by a device side that requests the channel connection, and values set by the user are transmitted to a device that responds to the channel connection in the channel connection process.

The device 200 as configured above may request the channel connection or may be requested to perform the channel connection depending on the circumstances. Accordingly, in the following description of the present invention, the channel connection process will be described on the assumption that a device that requests the channel connection is called a control device 310 and a device that is the subject of channel connection request is called a target device 320. The control device 310 and the target device 320 have a configuration similar to that of the device 200 of FIG. 2. Although the present invention can be applied to all short range wireless communication schemes, the ZigBee short range wireless communication is described herein for ease in understanding.

Figure 3:
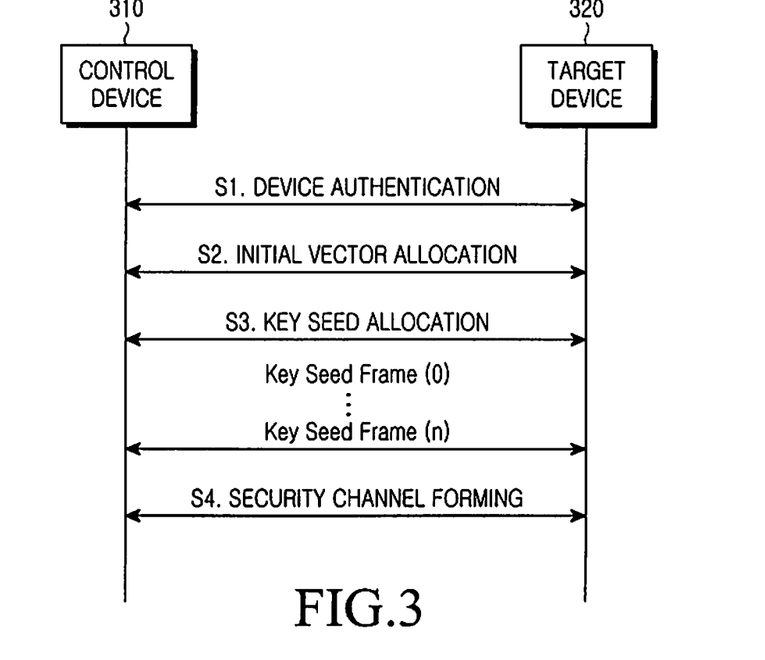
FIG. 3 is a flow diagram illustrating a channel connection process according to an embodiment of the present invention.

Referring to FIG. 3, in step S1, the control device 310 and the target device 320 perform mutual device authentication using a certificate, a sign, and a UID. If the authentication is successfully performed, in step S2, the security address generated by the target device 320 and the validity period of the security address are transferred to the control device 310 to allocate an initial vector. In step S3, the key seed distribution is performed through a security algorithm using the UID and the security address. In the present invention, the key seed distribution may be divided into a quick mode and a general mode. If the key seed distribution is completed, a link key using the key seed is generated in step S4, and the security channel using the link key is formed.

Figure 4A:
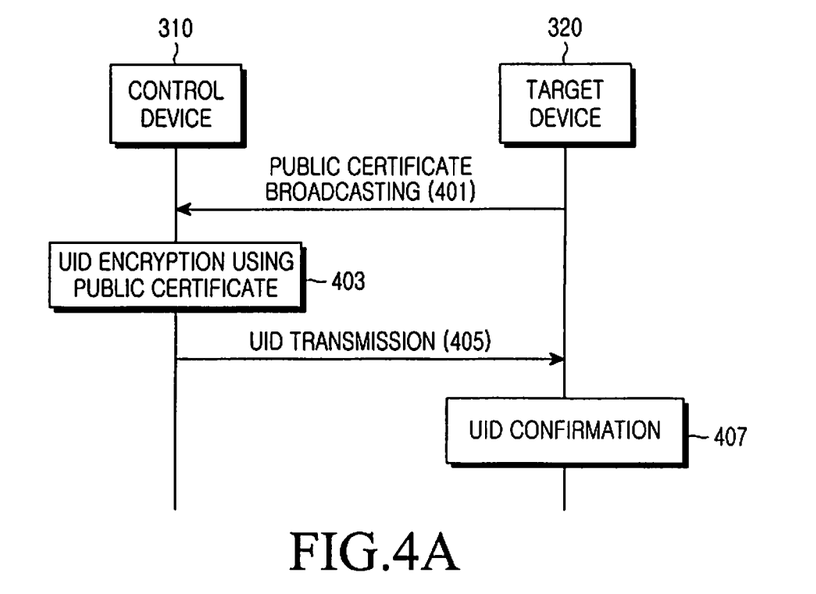
FIG. 4 to FIG. 7 are flow diagrams illustrating respective processes of FIG. 3 in detail according to an embodiment of the invention.
Figure 4B:
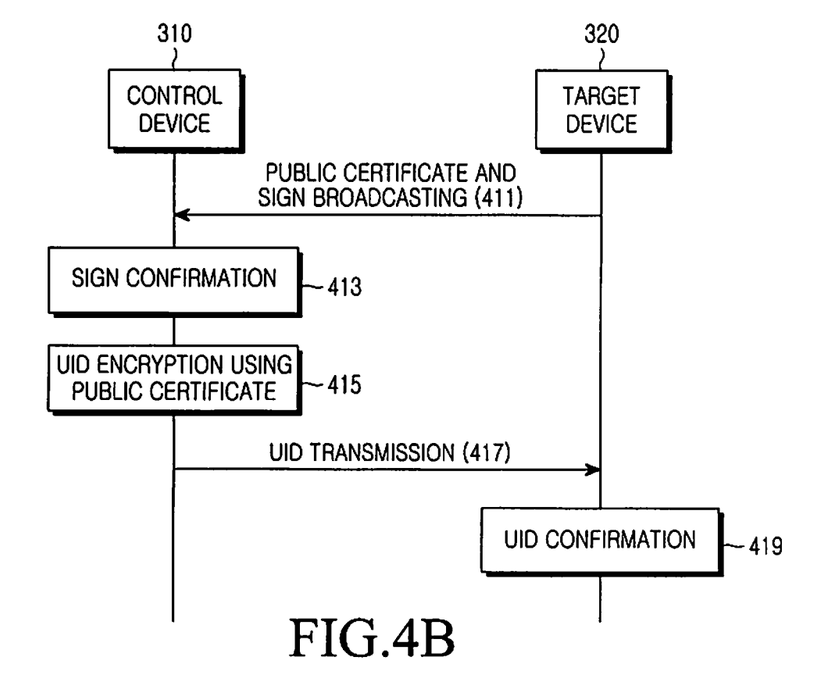

Hereinafter, with reference to FIGS. 4 to 7, steps S1 to S4 will be described in detail. FIGS. 4A and 4B illustrate steps corresponding to step S1. FIG. 4A shows an authentication process using a public certificate only, and FIG. 204B shows an authentication process using a public certificate and a sign.

Referring to FIG. 4A, in step 401, the target device 320 broadcasts the public certificate. Accordingly, the control device 310 can receive the public certificate, and authenticates the target device using the public certificate. The control device 310, in response to a user's request or if it is determined that a channel connection with the target device 310 for performing a specified function is required, encrypts its own UID using the public certificate of the target device 320 in step 403. The control device 310 proceeds to step 405, and transmits the encrypted UID to the target device 320. The target device 320, if the encrypted UID is received, decrypts and confirms the UID using its own public certificate in step 407.

In another embodiment of the present invention, in the case of using the sign, as shown in FIG. 4B, the target device 320 broadcasts both the public certificate and the sign in step 411. Accordingly, the control device 310 receives the public certificate and the sign, and confirms the sign in step 413. In step 415, the control device 310 encrypts its own UID using the public certificate of the target device 320. Then, the control device 310 proceeds to step 417, and transmits the encrypted UID to the target device 320. The target device 320, which has received the encrypted UID, decrypts and confirms the UID using its own public certificate in step 419.

A message that is used in the above-described authentication process may use, for example, a network command format of ZigBee RF4CE. The network command format is shown in Table 1 below.

TABLE 1

| Frame Control | Frame Counter | Command Identifier | Command Payload | FCS |
| --- | --- | --- | --- | --- |

In the case of using a message of the network command format, when the certificate is broadcast, an identifier indicating that the message is a message requesting a UID is included in the command identifier field of the message, and a certificate is included in the command payload. Also, when the UID is transmitted, an identifier indicating that the message is a response message to the UID request is included in the command identifier field of the message, and a UID is included in the command payload.

Accordingly, the kinds of commands included in the command identifier field are shown in Table 2 below. In an embodiment of the present invention, 0x0A and 0x0B of the command frame identifier are used.

TABLE 2

| Command Frame Identifier | Command Name |
| --- | --- |
| 0x01 | Discovery request |
| 0x02 | Discovery response |
| 0x03 | Pair request |
| 0x04 | Pair response |
| 0x05 | Unpair request |
| 0x06 | Key seed |
| 0x07 | Ping request |
| 0x08 | Ping response |
| 0x09 | Reserved |
| 0x0A | UID request |
| 0x0B | UID Reply |
| 0x0C-0xff | Reserved |

Figure 5:
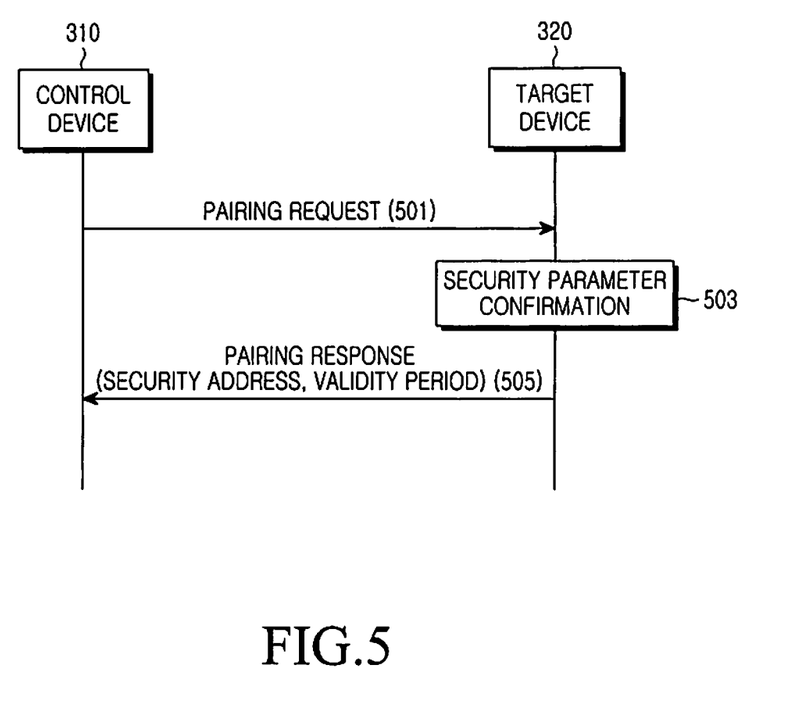

The control device 310, which has completed the authentication for the target device 320 in the process as shown in FIG. 4A or 4B, performs an initial vector allocation process according to the process illustrated in FIG. 5.

Referring to FIG. 5, the control device 310 transmits a pairing request in step 501. In this case, the pairing request includes a security parameter for requesting forming of the security channel. The security parameter, for example, may be transmitted in a state where it is included in a security capable field of a network node capability constant. The security setting information that includes information on a key seed distribution mode can also be included in the pairing request. Accordingly, the security setting information may be transmitted in a state where it is included in a reserved field of the network node capability constant. The format of the network node capability constant is shown in Table 3 below.

TABLE 3

| | bits: | | | |
| --- | --- | --- | --- | --- |
| 0 | 1 | 2 | 3 | 4-7 |
| Node type | Power source | Security capable | Channel normalization capable | Reserved |

Accordingly, if the pairing request is received, the target device 320 confirms whether the security channel forming request is included in the pairing request by confirming the security parameter in step 503. If the security channel forming request is included in the pairing request, the target device 320 generates a security address that corresponds to the control device 310, and sets a validity period of the generated security address. Then, in step 505, the target device 320 makes the pairing response including the security address and the validity period and transmits the pairing response to the control device 310.

If the security address and the validity period are transmitted through the above-described process and the initial vector allocation is completed, the target device 320 and the control device 310 confirm the currently set key seed distribution mode. The control device 310 can confirm the key seed distribution mode through its own internal setting information, and the target device 320 can confirm it through the security setting information included in the pairing request.

Figure 6:
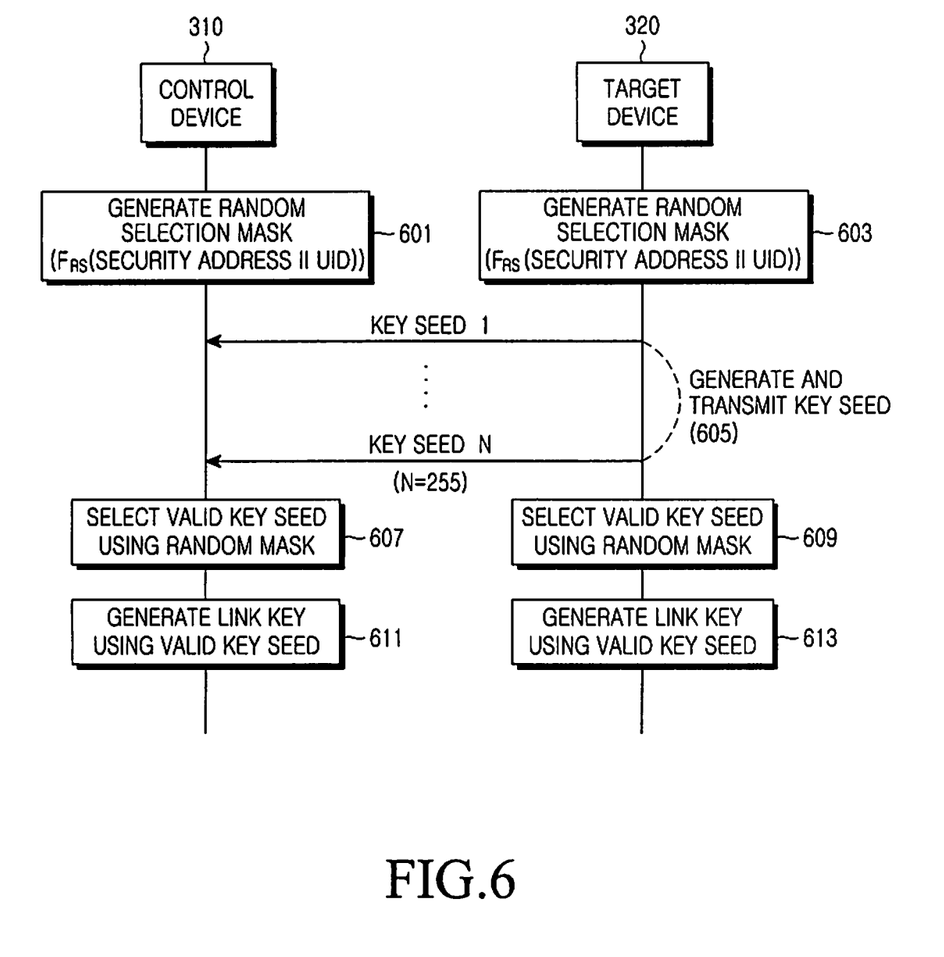
Figure 7:
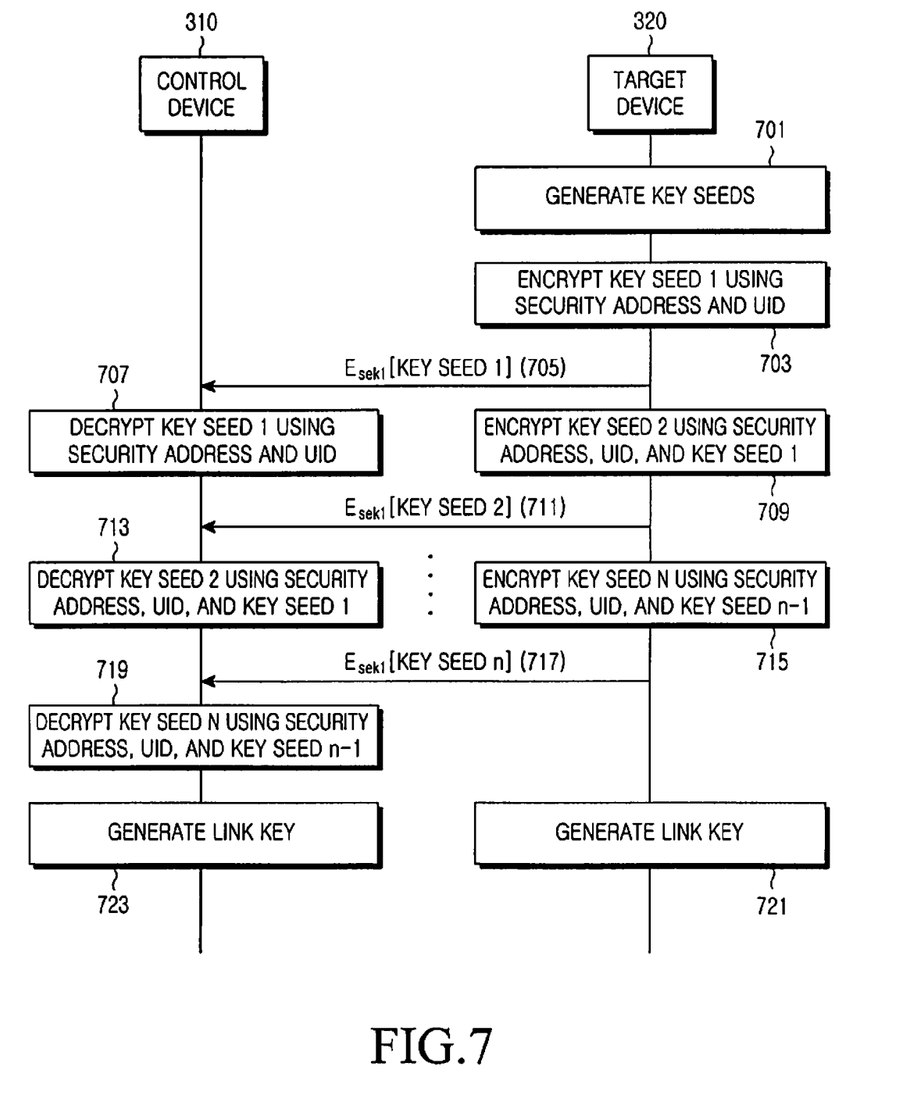

If the key seed distribution mode is a quick mode, the key seed distribution will be performed in the process as shown in FIG. 6, while if the key seed distribution mode is a general mode, the key seed distribution will be performed in the process as shown in FIG. 7.

FIG. 6 illustrates a key seed distribution process in the case where the security is set to a quick mode and the key capability is set to random selection. Referring to FIG. 6, the control device 310, which has received a pairing response that includes a security address and a validity period from the target device 320, generates a random selection mask using the security address and its own UID in step 601.

On the other hand, after transmitting the pairing response that includes the security address and the validity period, the target device 320 also generates a random selection mask using the transmitted security address and the UID received from the control device 310 in the process as shown in FIG. 4A or 4B in step 603. The random selection masks generated in steps 601 and 603 are the same, and are used in a process of selecting a valid key seed among key seeds generated by the target device 320.

If the generation of the random selection masks is completed, the target device 320 generates n-numbered key seeds and sequentially transmits the generated key seeds to the control device 310 in step 605. If the transmission of the n-numbered key seeds is completed, the control device 310 and the target device 320 select valid key seeds among the n-numbered key seeds using the random selection masks in steps 607 and 609, respectively.

The random selection mask is a random binary number composed of bits the number of which is the same as the number of the entire key seeds, i.e. n bits. For example, in the case where 255 key seeds are generated and transmitted, the random selection mask becomes a random binary number of 255 bits.

When the key seeds arranged in the order of their generation are compared with the numeral string of the random selection mask, the key seed that corresponds to "1" of the numeral string of the random selection mask is determined as the valid key seed. That is, the key seed generated in the order that corresponds to "1" of the numeral string of the random selection mask is determined as the valid key seed. For example, if the total number of key seeds is 3 and the random selection mask is "101", the first generated key seed and the thirdly generated key seed are determined as the valid key seed.

Since the key seeds are transmitted in the order of their generation, the target device 320 can select the valid key seed by comparing the reception order of the key seeds with the random selection mask.

If the selection of the valid key seed is completed, in steps 611 and 613, the control device 310 and the target device 320 generate link keys using the valid key seed and form a security channel between them using the link keys, respectively.

On the other hand, if the key seeds are distributed in a general mode, as illustrated in FIG. 7, the target device 320 generates n-numbered key seeds in step 701 after transmitting the pairing response that includes the security address and the validity period. In this case, n is a natural number. Then, in step 703, the target device encrypts the first generated key seed, i.e. the key seed 1, using the security address and the UID of the control device 310, and proceeds to step 705 to transmit the encrypted key seed 1 to the control device 310. The control device 310, which has received the encrypted key seed 1, decrypts the key seed 1 using the security address and the UID and stores the decrypted key seed 1 in step 707.

The target device 320 encrypts the key seed 2 using the security address, the UID of the control device 310, and the key seed 1 in step 709, and transfers the encrypted key seed 2 to the control device 310 in step 711. Accordingly, the control device 310 decrypts the encrypted key seed 2 using the security address, the UID, and the key seed 1, and stores the key seed 2 in step 713.

These processes are repeatedly performed until the key seed reaches the key seed n. That is, the target device 320 encrypts the seed n using the security address, the UID, and the seed n−1 in step 715, and transfers the encrypted seed n to the control device 310 in step 717. Accordingly, the control device 310 decrypts the encrypted key seed n using the security address, the UID, and the key seed n−1, and stores the key seed n in step 719.

If the transmission of all the key seeds up to the key seed n is completed as above, the control device 310 and the target device 320 generate link keys using the entire n-numbered key seeds and form security channels between them using the link keys, respectively, in steps 723 and 721.

Figure 8:
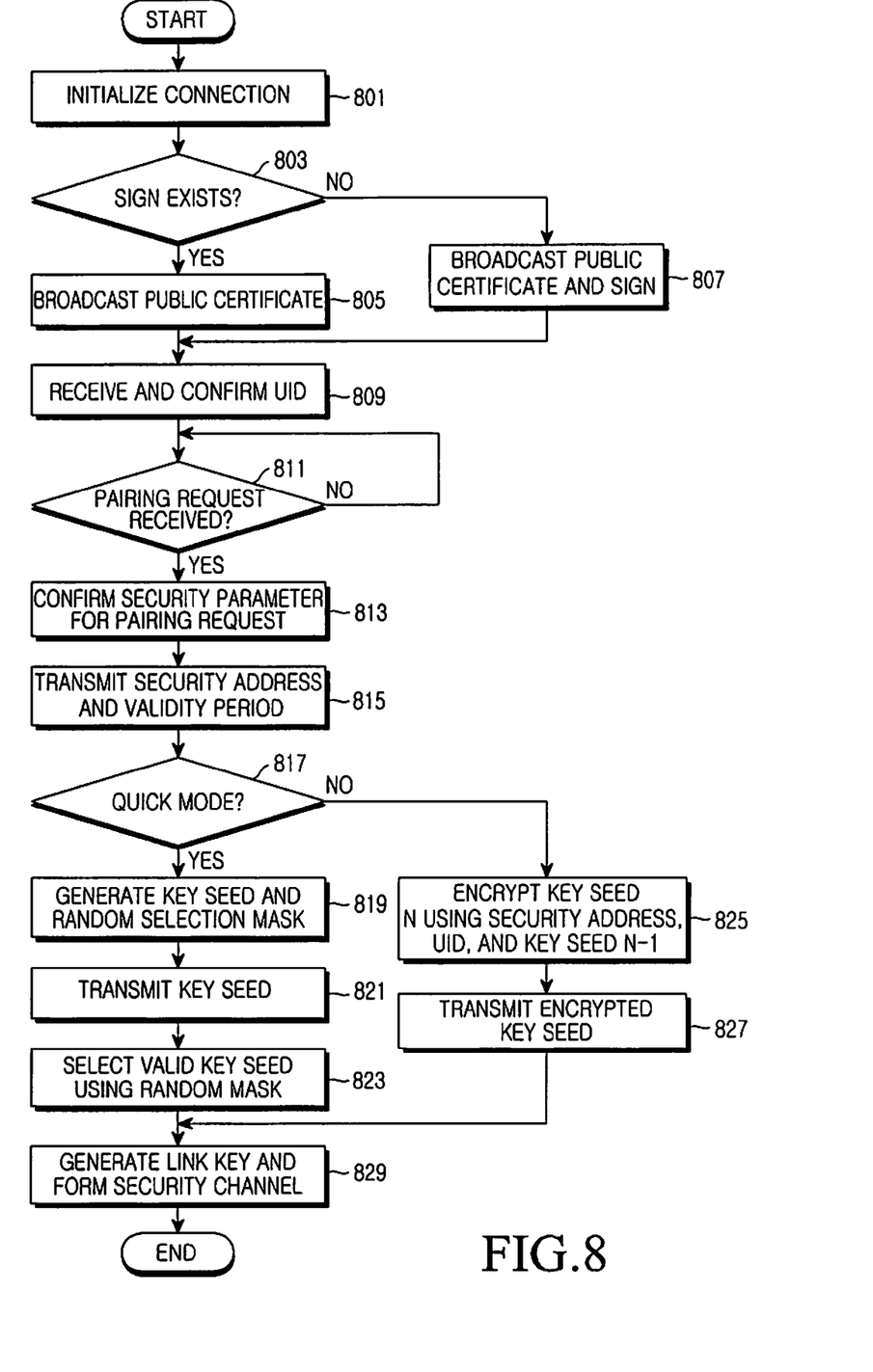
FIGS. 8 and 9 are flow charts illustrating the operation processes of a device according to an embodiment of the present invention.
Figure 9:
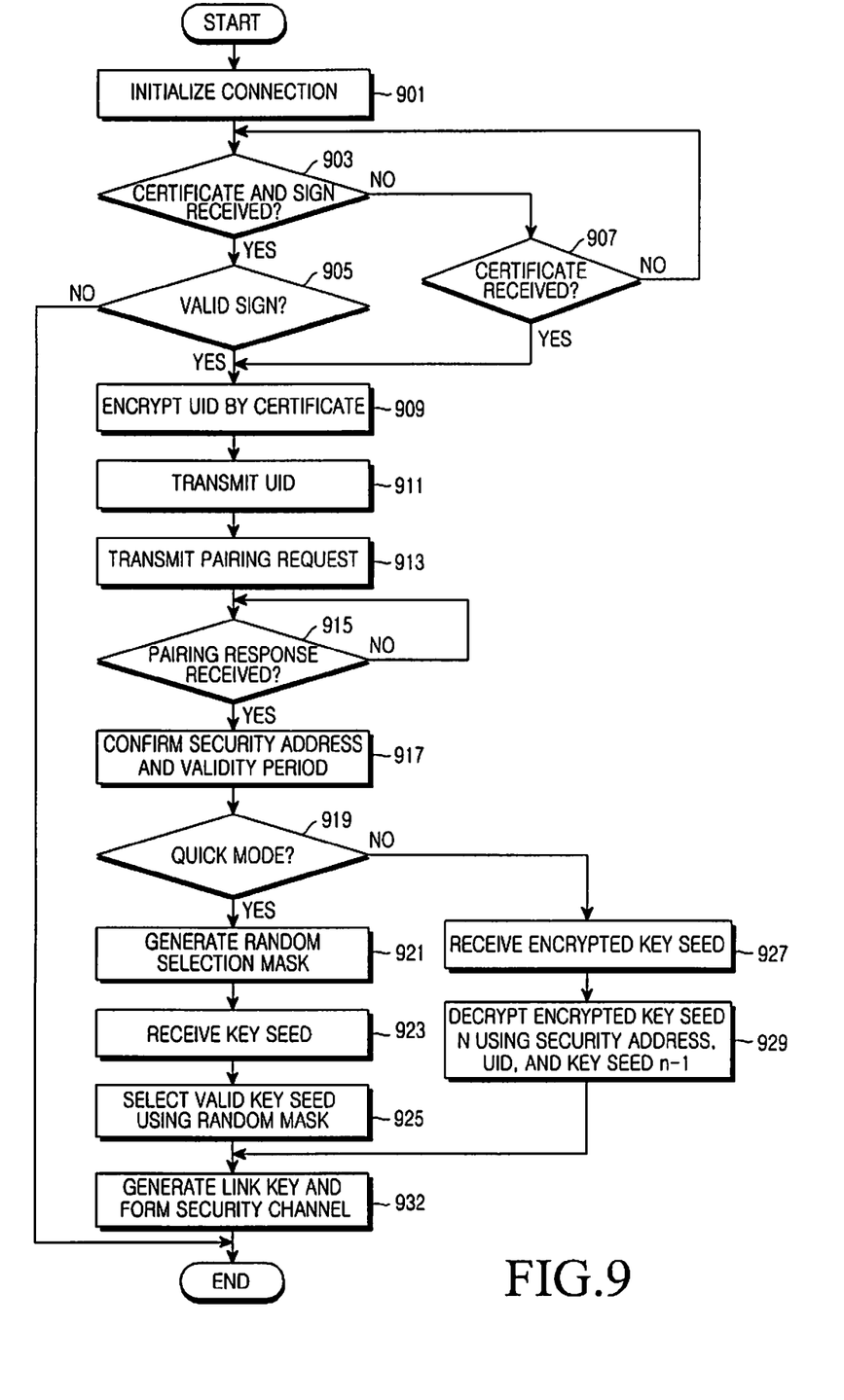

FIGS. 8 and 9 are views illustrating the operation processes of a device 200 according to an embodiment of the invention. FIG. 8 is a flowchart illustrating the operation process in the case where the device 200 receives a channel connection request from another device, and FIG. 9 is a flowchart illustrating the operation process in the case where the device 200 requests a channel connection from another device.

Referring to FIG. 8, the processor 210 of the device 200 initializes the connection in step 801, and confirms whether a sign exists in the memory unit 230 in step 803. If the sign exists, the processor 210 broadcasts a public certificate in step 805, while if the sign does not exist, the processor 210 broadcasts both the public certificate and the sign in step 807.

Thereafter, if a UID is received from a specified device, the processor 210 decrypts and confirms the UID using its own public certificate in step 809. Then, if the processor 210 confirms that a pairing request is received from a specified device in step 811, it confirms that the forming of the security channel is requested by confirming the security parameter included in the pairing request in step 813. Then, the processor 210 generates a security address that corresponds to the specified device, sets a validity period, makes the security address and the validity period included in a pairing response, and transmits the pairing response to the specified device in step 815.

Then, the processor 210 confirms whether the key seed distribution mode is a quick mode or a general mode by confirming the security setting information included in the pairing request in step 817. If the key seed distribution mode is the quick mode, the processor 210 proceeds to step 819 to generate the random selection mask and n−m=numbered key seeds, and sequentially transmits the n-numbered key seeds to the specified device in step 821. Also, the processor 210 selects the valid key seed using the random mask in step 823, proceeds to step 829 to generate the link key, and forms the security channel.

If the key seed distribution mode is the general mode as a result of the confirmation in step 817, the processor 210 proceeds to step 825 to generate the n-numbered key seeds, and encrypts the respective key seeds using the security address, the UID of the specified device, and the seed n−1. However, the processor 210 encrypts the key seed 1, which is the first key seed, using the security address and the UID of the specified device. Then, the processor 210 transmits the encrypted key seed to the specified device in step 827, proceeds to step 829 to generate the link key, and forms the security channel.

Referring to FIG. 9, if the device 200 requests the channel connection, the processor 210 initializes the connection in step 901, and proceeds to step 903 to confirm whether the public certificate and the sign of the specified device are received. If both the public certificate and the sign are received, the processor 210 proceeds to step 905 to confirm whether the received sign is valid, and if the sign is valid, it proceeds to step 909. In the case where only the public certificate is received, the processor 210 proceeds to step 909 through confirmation in step 907.

The processor 210 encrypts its own UID by the received public certificate in step 909, and transmits the encrypted UID to the specified device in step 911. Then, the processor 210 transmits the pairing request that includes the security channel forming request to the specified device in step 913. Thereafter, if the processor 210 receives the pairing response in step 915, it proceeds to step 917 to confirm the security address and the validity period of the security address from the pairing response.

Then, the processor 210 confirms the current security setting in step 919, and if the present mode is a quick mode, it proceeds to step 921 to generate the random selection mask. The processor 210 sequentially receives the key seeds from the specified device in step 923, and if the reception of the key seeds is completed, the processor selects the valid key seed using the random mask in step 925, and proceeds to step 932 to generate the link key, and forms the security channel. If the present mode is not the quick mode in step 919, the processor receives the encrypted key seed in step 927, and then decrypts the encrypted seed n using the security address, the UID of the specified device, and the seed n−1 in step 929. However, the processor 210 decrypts the key seed 1, which is the first key seed, using the security address and the UID of the specified device. If all the key seeds are acquired as above, the processor 210 proceeds to step 932 to generate the link key using the acquired key seed, and forms the security channel.

According to the present invention, the secrecy, integrity, and availability for the key seed values used to set a security channel between two devices that perform short range communication can be secured. Accordingly, an accurate security channel can be safely set between the two devices.

While the invention has been shown and described with reference to the embodiments thereof, various modifications may be made without departing from the scope of the invention. For example, although it is exemplified that the public key is the public certificate in the above-described embodiments, other kinds of public keys may be used. Also, in the ZigBee short range communication, the control device may be a remote control for remotely controlling the target device, for example, a mobile communication terminal, and the target device may be a device that is remotely controlled by the control device, for example, a television receiver, a home theater, a computer, or the like. Accordingly, the scope of the invention is not defined by the above-described embodiments, but should be defined by the appended claims and their equivalents.

What is claimed is:

1. A method of forming a channel in short range wireless communication, comprising the steps of:
   receiving, by a control device, a public key that is broadcast by a target device;
   encrypting, by the control device, its own UID (Unique Identifier) using the public key and transmitting the encrypted UID to the target device;
   transmitting, by the control device, a pairing request to the target device;
   receiving, by the control device, a pairing response corresponding to the pairing request;
   safely receiving a key seed from the target device using a security address included in the pairing response and the UID; and
   generating, by the control device, a link key using the received key seed and forming a security channel with the target device.

2. The method as claimed in claim 1, wherein receiving the key seed comprises:
   generating a selection mask using the security address and the UID;
   sequentially receiving a plurality of key seeds from the target device; and
   selecting a valid key seed from the plurality of key seeds using the selection mask;
   wherein forming the security channel includes:
   generating the link key using the valid key seed; and
   forming the security channel using the link key.

3. The method as claimed in claim 2, wherein the selection mask is a binary number composed of bits, the number of the bits is the same as the number of the entire key seeds, and the valid key seed is a key seed received in the order that corresponds to "1" of a numeral string of the selection mask when the numeral string of the selection mask is compared with the plurality of key seeds arranged in the received order.

4. The method as claimed in claim 1, wherein receiving the key seed comprises:
   receiving n-numbered encrypted key seeds;
   decrypting the first key seed using the UID and the security address; and
   acquiring n-numbered key seeds in total by decrypting the second to $n^{th}$ key seeds using the UID, the security address, and the $(n-1)^{th}$ key seed, respectively;
   wherein the security channel is formed using the acquired key seeds.

5. The method as claimed in claim 1, wherein the public key is a public certificate, and further comprising verifying a sign if the sign issued by an authentication authority is received together with the public certificate from the target device.

6. A method of forming a channel in short range wireless communication, comprising the steps of:
   broadcasting a public key by a target device;
   receiving, by the target device, a UID (Unique Identifier) encrypted using the public key from a control device;
   receiving, by the target device, a pairing request from the control device;
   making, by the target device, a security address that corresponds to the control device included in a pairing response and transmitting the pairing response to the control device;
   generating, by the target device, a key seed and safely transmitting the key seed to the control device using the security address and the UID; and
   generating, by the target device, a link key using the key seed and forming a security channel with the control device.

7. The method as claimed in claim 6, wherein transmitting the key seed comprises:
   generating a selection mask using the security address and the UID;

sequentially generating and transmitting a plurality of key seeds; and selecting a valid key seed from the plurality of key seeds using the selection mask;

wherein forming the security channel includes:

generating the link key using the valid key seed; and forming the security channel using the link key.

8. The method as claimed in claim 7, wherein the selection mask is a binary number composed of bits, the number of the bits is the same as the number of the entire key seeds, and the valid key seed is a key seed generated in the order that corresponds to "1" of a numeral string of the selection mask when the numeral string of the selection mask is compared with the plurality of key seeds arranged in the generated order.

9. The method as claimed in claim 6, wherein transmitting the key seed comprises:

generating n-numbered key seeds;

encrypting the first key seed using the UID and the security address and transmitting the encrypted key seed; and encrypting the second to $n^{th}$ key seeds using the UID, the security address, and an $(n-1)^{th}$ key seed, respectively, and transmitting all the n-numbered key seeds;

wherein the security channel is formed using the n-numbered key seeds, and where n is a natural number.

10. The method as claimed in claim 6, wherein the public key is a public certificate, and if the target device stores a sign issued by an authentication authority, the target device broadcasts the sign together with the public certificate.

11. An apparatus for forming a channel of a control device that performs short range wireless communication, comprising:

a short range transmission/reception unit performing the short range wireless communication; and a processor controlling the short range transmission/reception unit to receive a public key that is broadcast by a target device, encrypting its own UID (Unique Identifier) using the public key and transmitting the encrypted UID to the target device, transmitting a pairing request to the target device, receiving, by the control device, a pairing response corresponding to the pairing request, safely receiving a key seed from the target device using a security address included in the pairing response and the UID, and generating a link key using the received key seed to form a security channel with the target device.

12. The apparatus as claimed in claim 11, wherein the processor generates a selection mask using the security address and the UID, receives a plurality of key seeds sequentially from the target device, selects a valid key seed from the plurality of key seeds using the selection mask, generates the link key using the valid key seed, and forms the security channel using the link key.

13. The apparatus as claimed in claim 12, wherein the selection mask is a binary number composed of bits, the number of the bits is the same as the number of the entire key seeds, and the valid key seed is a key seed received in the order that corresponds to "1" of a numeral string of the selection mask when the numeral string of the selection mask is compared with the plurality of key seeds arranged in the received order.

14. The apparatus as claimed in claim 11, wherein the processor receives n-numbered encrypted key seeds, decrypts the first key seed using the UID and the security address, acquires n-numbered key seeds in total by decrypting the second to $n^{th}$ key seeds using the UID, the security address, and the $(n-1)^{th}$ key seed, respectively, and forms the security channel using the acquired key seeds.

15. The apparatus as claimed in claim 11, wherein the public key is a public certificate, and if a sign issued by an authentication authority is received together with the public certificate from the target device, the processor verifies the sign.

16. An apparatus for forming a channel of a target device that performs short range wireless communication, comprising:

a short range transmission/reception unit performing the short range wireless communication; and a processor controlling the short range transmission/reception unit to broadcast a public key, receiving a UID (Unique Identifier) encrypted using the public key from a control device, if a pairing request is received from the control device, making a security address that corresponds to the control device included in a pairing response and transmitting the pairing response to the control device, generating a key seed, safely transmitting the key seed to the control device using the security address and the UID, and generating a link key using the key seed to form a security channel with the control device.

17. The apparatus as claimed in claim 16, wherein the processor generates a selection mask using the security address and the UID, sequentially generates and transmits a plurality of key seeds, selects a valid key seed from the plurality of key seeds using the selection mask, generates the link key using the valid key seed, and forms the security channel using the link key.

18. The apparatus as claimed in claim 17, wherein the selection mask is a binary number composed of bits, the number of the bits is the same as the number of the entire key seeds, and the valid key seed is a key seed generated in the order that corresponds to "1" of a numeral string of the selection mask when the numeral string of the selection mask is compared with the plurality of key seeds arranged in the generated order.

19. The apparatus as claimed in claim 16, wherein the processor generates n-numbered key seeds, encrypts the first key seed using the UID and the security address to transmit the encrypted key seed, encrypts the second to $n^{th}$ key seeds using the UID, the security address, and an $(n-1)^{th}$ key seed, respectively, to transmit all the n-numbered key seeds, and forms the security channel using the n-numbered key seeds, where n is a natural number.

20. The apparatus as claimed in claim 16, wherein the public key is a public certificate, and if a sign issued by an authentication authority is stored in a memory, the processor broadcasts the sign together with the public certificate.

* * * * *